No. 821,522. PATENTED MAY 22, 1906.
A. P. MORROW.
BACK PEDALING BRAKE.
APPLICATION FILED NOV. 26, 1901.
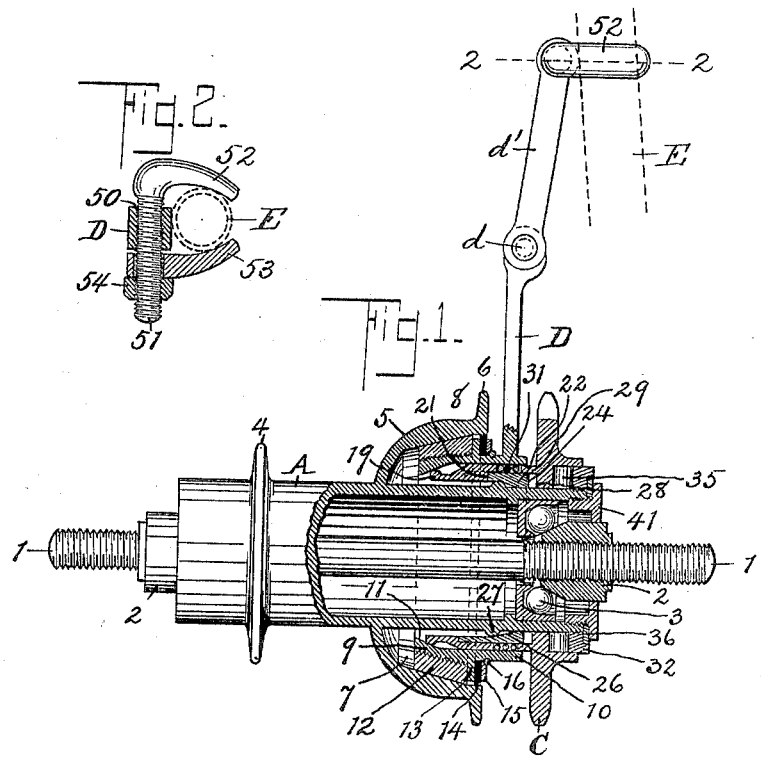
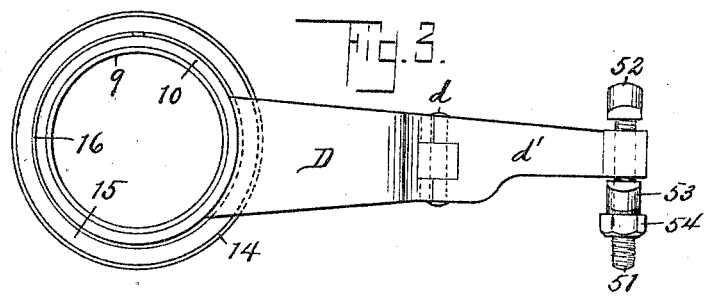
Witnesses—
C. M. Perkins
F. Bissell
Inventor—
Alexander P. Morrow
by Osgood & Davis
his attys

UNITED STATES PATENT OFFICE.

ALEXANDER P. MORROW, OF ELMIRA, NEW YORK.

BACK-PEDALING BRAKE.

No. 821,522.     Specification of Letters Patent.     Patented May 22, 1906.

Application filed November 26, 1901. Serial No. 83,749.

*To all whom it may concern:*

Be it known that I, ALEXANDER P. MORROW, a citizen of the United States, and a resident of Elmira, in the county of Chemung and State of New York, have invented certain new and useful Improvements in Back-Pedaling Brakes, of which the following is a specification.

This invention relates to improvements in back-pedaling brakes, some of which are capable of use with many such brakes for bicycles and like motor-vehicles and others of which are particularly applicable to the form of back-pedaling coaster-brake set forth in United States Letters Patent No. 646,302, dated March 27, 1900.

In one type of back-pedaling brakes at present known there is a brake-arm that is attached to one of the bars of a bicycle—such, for instance, as one of the side bars of the rear triangle thereof—and this arm is attached to such a portion of the braking mechanism that when the brake is applied the said arm holds stationary a suitable portion thereof, so that the rotating wheel of the bicycle is put into frictional contact with the part so held stationary by said arm and the braking action ensues.

On account of the differences in the shapes of the frames of bicycles and the difference of angle occurring between the braking mechanism and that portion of the frame to which the above-mentioned arm is attached the braking mechanism is often cramped on account of the lack of proper adjustment and alinement of said brake-arm. In order, therefore, to avoid these difficulties, I have produced improvements in back-pedaling brakes whereby I hinge the brake-arm so that its end can swing transversely to the bicycle-frame. With a brake-arm so hinged or made capable of bending the angle of the frame-piece to which the arm is attached need not interfere with quick, easy, and accurate adjustment of the mechanism, and the attachment is effected in such manner that the operation of the braking mechanism is not diminished by any twisting of the brake-arm and the connected parts of the braking mechanism. These improvements may be used independently and produce a brake-arm in back-pedaling brakes of the type mentioned which is easily adjustable to bicycles and motor-vehicles of various types and shapes and which can be fitted to such bicycles and motor-vehicles by any ordinary mechanic without danger of injuring the braking mechanism.

The drawings herein show these improvements as applied to the brake described and illustrated in said Letters Patent.

Figure 1 of the drawings is a top plan view, partly in section, of a back-pedaling brake embodying the improvements hereinafter described. Fig. 2 is a detail view of the clip, partly in section, on the line 2 2 of Fig. 1. Fig. 3 is a side elevation of the brake-arm, brake-ring, and clip.

Referring to the drawings, the hub of the rear wheel of the bicycle consists of the cylinder A, supported on an axle 1, provided with the usual ball-bearings, having the cones 2 2 and bearing-balls 3 3. Adjacent to one end of the hub is a spoke-flange 4, as usual. At a proper point on the hub is formed an annular brake-flange 5, which overhangs the hub and the mouth of which opens toward the brake end of the hub. Upon the brake-flange is another spoke-flange 6, to which the spokes of the rear wheel may be attached in the usual manner. The inner face or surface 7 of this brake-flange 5 is preferably flaringly inclined for the greater part of its depth and at the mouth is straight and parallel with the axis of the hub, as at 8.

The brake-shoe has a metal portion consisting of a sleeve or cylinder 9, formed with a cylindrical extension or flange 10 and an interior inclined or tapered portion 11 and exterior screw-threads. On the screw-threads is fastened the brake-shoe 12, having a contour fitting the interior of the brake-flange 5, as shown.

The metal portion 9 is a non-rotary portion of the braking mechanism and is preferably provided with a flange 13, against which the brake-shoe 12 is screwed to form a back therefor. On the outside of the flange 13 rests a fibrous ring 14, fitting within the mouth 8 of the brake-flange 5 and adapted to exclude the entrance of dust or dirt to the interior mechanism of the brake. This fibrous ring may be made of felt. It is held in place by a rigid ring 15, pressing against the outer side of the fibrous ring 14 and holding the latter between the ring 15 and the flange 13. The ring 15 fits upon the flange or extension 10 and is held in place by a spring-ring 16, fitting in a groove in the flange or extension 10 and adapted to hold the ring 15 tightly against the fibrous ring 14.

Mounted on the hub is a brake-operating ring 19, having an annular bead or rib at its inner end to engage the inclined or tapering portion 11. This brake-operating ring has a limited longitudinal movement on the hub A, so that when moved toward the left in Fig. 1 it presses the brake-ring 9 and shoe 12 against the surface of the brake-flange 5, and when the force that moves said brake-operating ring toward the left is discontinued the brake-operating ring is automatically released from the brake-ring 9. In the interior of the brake-operating ring are formed cam-like engaging surfaces 21 to engage with similar cam-surfaces on the clutch-ring 22.

On the outer end of the clutch-ring 22 are formed a series of cams or teeth at 24 to engage similar cams or teeth at 28 on the inner face of the sprocket-wheel C. The interior surface of the clutch-ring 22 has a tapered or conical portion 26, that is adapted to ride upon a bead 27 on the hub, so that when the clutch-ring is forced toward the left the surface 26 engages the bead 27 in order to drive the hub A forward.

The sprocket-wheel C has a circular flange 29, that is adapted to extend inward around an outer portion of the clutch-ring, and between the flange 29 and the outer face of the brake-operating ring 19 is a spiral spring 31, tending to force the sprocket-wheel away from the brake-operating ring 19.

Upon the outer end of the hub is screwed a collar 32, and the inner end of this ring is provided with a suitable number of recesses in which are radially-disposed antifriction-rollers 35, which are adapted to bear against the outer face of the sprocket-wheel C, as shown. The spring 31 therefore presses the sprocket-wheel C against the antifriction-rollers 35.

The collar 32 is locked in place, so as to prevent rotation thereof, by any suitable means, such as by a locking-ring 36, engaging any suitably-formed recesses in the collar 32 and in the hub A, and a like nut 41 of suitable form is screwed to the hub and holds the locking-ring 36 in its proper position.

The operation of the device is as follows: During the usual forward movement of the vehicle the sprocket-wheel is locked to the hub by reason of the inclined cams or ratchet-teeth 24 and 28, causing movement of the clutch-ring 22 from the left in Fig. 1 and the consequent gripping of the bead 27 thereby. These cams or ratchet-teeth are so arranged that this gripping takes place during the ordinary forward-driving movement of the sprocket-wheel C. The corresponding cams or inclines on the clutch-ring 22 and on the brake-operating ring 19 do not cause movement of the brake-operating ring toward the left when the parts are in the position just described for forward driving of the bicycle. All backward pressure upon the sprocket-wheel from clutching and braking movements of the other parts is resisted by the antifriction-rollers 35. When it is desired to "coast" or to permit free running of the bicycle, the feet are held stationary, whereby, of course, the sprocket-wheel C is held stationary as well. The hub A now turns in the same direction in which it is driven, the pressure of the cam-surfaces 24 and 28 tending to force the clutch-ring 22 toward the left, and thereupon the clutch-ring is released automatically from the bead 27, whereupon the hub revolves freely without causing movement of the sprocket-wheel C or of the feet of the rider. When the rider desires to operate the brake mechanism, he back-pedals, which produces a reverse movement of the sprocket-wheel C. The engagement of the ratchet-teeth 24 and 28 causes the clutch-ring 22 to revolve with the sprocket-wheel C in the reverse direction, and the cam inclines at 21 to the clutch-ring and on the brake-operating ring cause lateral movement of the brake-operating ring toward the left, thus bringing it into contact with the brake-ring 9 and forcing said brake-ring toward the left, so that the brake-shoe 12 comes in contact with the brake-flange 5 on the hub A. This puts a frictional resistance upon the brake-flange 5 and in proportion to the force employed in back-pedaling produces operation of the brake to stop revolution of the hub A.

The foregoing mechanism is described in my said United States Patent No. 646,302, except the dust-excluding ring 14 and the mechanism for holding it in place. My other improvements are now to be described.

To one side of the flange or extension 10 of the brake-ring is fastened a brake-arm D. I prefer to make the brake-arm and the brake-ring composed of the flange or extension 10, the portion 9, and the flange 13 all in one piece, although the flange 13 need not be integral with it and the brake-arm D may be very short. The brake-arm D is jointed or hinged at a suitable point in any suitable manner—as, for instance, by the pin $d$—so that the outer end of the brake-arm can move transversely (to the right or left in Fig. 1) with reference to the brake-ring, so as to be fastened to some portion of the frame of the vehicle not in proper alinement with that portion of the brake that is attached to the brake-ring.

By this means my braking mechanism can be attached to bicycles and motor-vehicles of different shapes and forms by a suitable clip attached to the free end of the hinged or jointed brake-arm D and without disturbing the relation of the parts of the braking mechanism or putting distorting strains upon the brake-arm tending to disarrange a proper working of the brake-shoe or other parts of the device.

Any suitable clip or fastening may be employed for attaching the end of the brake-arm to the bicycle; but I prefer the following: Transversely through the end of the brake-arm is cut a threaded aperture 50, in which the threads of a bolt 51 fit. One end of the bolt (the upper end in Fig. 2) is turned over to form an arm 52. This arm may therefore be set at different distances from the brake-arm D by screwing the bolt 51 in one direction or the other, and at the same time the angle of the arm 52 with reference to the brake-arm D can be adjusted within any limit in circular position. On that portion of the bolt 51 that projects through (below in Fig. 2) the brake-arm D is a second arm 53, fitting loosely upon the threaded bolt and adapted to slip freely up and down thereon, and on the bolt outside of said arm 53 is a lock-nut 54 (which may be single or double) for pressing the arm 53 against the frame-piece E of the bicycle or motor-vehicle. It is now clear that with the clip described frame-pieces of different sizes and set at different angles to the axis of the mechanism may be grasped and firmly held and at different horizontal heights with reference to the middle line of the brake-arm.

What I claim is—

1. In a back-pedaling brake, a wheel-hub, a brake member on said hub, a non-rotary brake member, means actuated by back-pedaling for making braking contact between the rotary member and the non-rotary member, a brake-arm rigidly attached to said non-rotary member and hinged or jointed between its ends to swing into positions at different angles to the axis of the hub, whereby the end of the brake-arm may be fastened to a frame-piece without disturbing said non-rotary member, and means for fastening said brake-arm to said frame-piece.

2. In a back-pedaling brake, a wheel-hub having a brake-surface, a non-rotary brake member movable against and away from said surface, a brake-arm connected to said non-rotary member and hinged or jointed between its ends to swing into positions at different angles to the axis of the hub, whereby the end of said brake-arm may be attached to the frame of a bicycle at various angles without affecting the non-rotary member, and means for fastening the end of said arm to said frame.

3. In a back-pedaling brake, a wheel-hub, a braking mechanism employed in conjunction with said wheel-hub and comprising a non-rotary brake member and means actuated by back-pedaling for making braking contact between said non-rotary member and said hub by a longitudinal movement along the axis of said hub, a brake-arm rigidly attached to said non-rotary device and hinged or jointed between its ends, and means for fastening the end of said brake-arm to a frame-piece, whereby the end of the brake-arm is held rigidly on the frame-piece and the non-rotary member may move as described.

4. In a back-pedaling brake comprising a non-rotary member and a rotary member, one of said members being longitudinally movable in the direction of the axis of such rotation, a brake-arm connected to said non-rotary member and hinged or jointed between its ends, and means for fastening the end of said arm to the frame of a bicycle, whereby the end of said brake-arm may be fastened firmly to said frame and said non-rotary member may move as described.

5. In a back-pedaling brake, a wheel-hub, a braking mechanism employed in conjunction with said hub and comprising a non-rotary brake member, means actuated by back-pedaling for making contact between a rotary part of the hub and said non-rotary member, and a brake-arm having a clip on its end comprising a screw-clamp composed of a bolt passing through said arm, whereby it is movable rotarily and longitudinally as to said arm and having an integral head forming one member of the clip and a second arm fitting on said bolt and forming the other member of the clip and mechanism for adjusting the position of the second arm with reference to the head whereby the clip is adapted to fit frame-pieces of various sizes and at various angles and heights with reference to the brake-arm, substantially as described.

6. In a back-pedaling brake, a wheel-hub, a braking mechanism employed in connection with said hub and comprising a non-rotary brake member, means actuated by back-pedaling for making contact between a rotary part of the hub and said non-rotary member, and a brake-arm having a clip on its end comprising a clamp composed of a bolt screwed through said arm and having an integral head forming one member of the clip, whereby the bolt is movable rotarily and longitudinally as to said arm, a second arm upon said bolt and adjustable means for adjusting the position of said second arm with reference to said head and clamping a frame-piece of a bicycle, whereby the clip is adapted to fit frame-pieces of various sizes and at various angles and heights with reference to the brake-arm, substantially as described.

ALEXANDER P. MORROW.

Witnesses:
T. H. FULTON,
D. L. WHITTIER.